United States Patent
Eguchi

(10) Patent No.: US 7,536,015 B2
(45) Date of Patent: May 19, 2009

(54) SETTING METHOD FOR WIRELESS COMMUNICATION DEVICE, COMPUTER PERIPHERAL EQUIPMENT, AND INFORMATION PROCESSOR

(75) Inventor: Tadashi Eguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 749 days.

(21) Appl. No.: 10/984,912

(22) Filed: Nov. 9, 2004

(65) Prior Publication Data

US 2005/0125682 A1    Jun. 9, 2005

(30) Foreign Application Priority Data

Dec. 3, 2003   (JP)   ............... 2003-405228

(51) Int. Cl.
*H04K 1/00*   (2006.01)
(52) U.S. Cl. .................................... 380/270
(58) Field of Classification Search .............. 380/270
See application file for complete search history.

(56) References Cited

U.S. PATENT DOCUMENTS

| | | | | |
|---|---|---|---|---|
| 3,088,802 | A * | 5/1963 | Clements et al. ............ | 423/463 |
| 5,745,576 | A | 4/1998 | Abraham et al. | |
| 6,166,650 | A | 12/2000 | Bruwer | |
| 7,133,378 | B2 * | 11/2006 | Kashiwagi et al. .......... | 370/328 |
| 2002/0080967 | A1 * | 6/2002 | Abdo et al. ................. | 380/270 |
| 2002/0174206 | A1 * | 11/2002 | Moyer et al. ................ | 709/221 |
| 2002/0174254 | A1 | 11/2002 | Kita et al. | |
| 2003/0059051 | A1 | 3/2003 | Hatano et al. | |
| 2003/0092395 | A1 * | 5/2003 | Gassho et al. ................. | 455/68 |
| 2003/0100335 | A1 | 5/2003 | Gassho et al. | |
| 2004/0117635 | A1 * | 6/2004 | Karaoguz et al. ........... | 713/182 |

FOREIGN PATENT DOCUMENTS

| | | |
|---|---|---|
| JP | 2000-59388 | 2/2000 |
| JP | 2001-325166 | 11/2001 |
| JP | 2002-247056 | 8/2002 |

(Continued)

OTHER PUBLICATIONS

English Translation of an Office Action issued on Apr. 11, 2008 by the Chinese Patent Office for Corresponding Chinese Appl. No. 200410097963.4.
English Translation of JP 2003-218875.
English Translatoin of JP 2002-247056.
A Communication from the European Patent Office issued on Mar. 10, 2006 for Appl. No. 04257040.8 - 2416.

(Continued)

*Primary Examiner*—Kambiz Zand
*Assistant Examiner*—Teshome Hailu
(74) *Attorney, Agent, or Firm*—Locke Lord Bissell & Liddell LLP

(57) ABSTRACT

An SSID and an encryption key of a wireless LAN apparatus of computer peripheral equipment are calculated based on a manufacturer's serial number of the computer peripheral equipment to be stored in the wireless LAN apparatus of the computer peripheral equipment. On the other hand, for an SSID and an encryption key of a computer wirelessly connected to the computer peripheral equipment, when driver software of the computer peripheral equipment is installed, a user inputs the manufacturer's serial number of the computer peripheral equipment, and the SSID and the encryption key of a wireless LAN apparatus are calculated on the computer to be stored in the wireless LAN apparatus of the computer. Thus, the same SSID and encryption key as those of the computer peripheral equipment can be set in the computer.

6 Claims, 4 Drawing Sheets

FOREIGN PATENT DOCUMENTS

| | | |
|---|---|---|
| JP | 2003-110543 | 4/2003 |
| JP | 2003-163668 | 6/2003 |
| JP | 2003-218875 | 7/2003 |

OTHER PUBLICATIONS

Office Action issued on Oct. 9, 2007 by the European Patent Office for Appl. No. 04257040.8-2412.

* cited by examiner

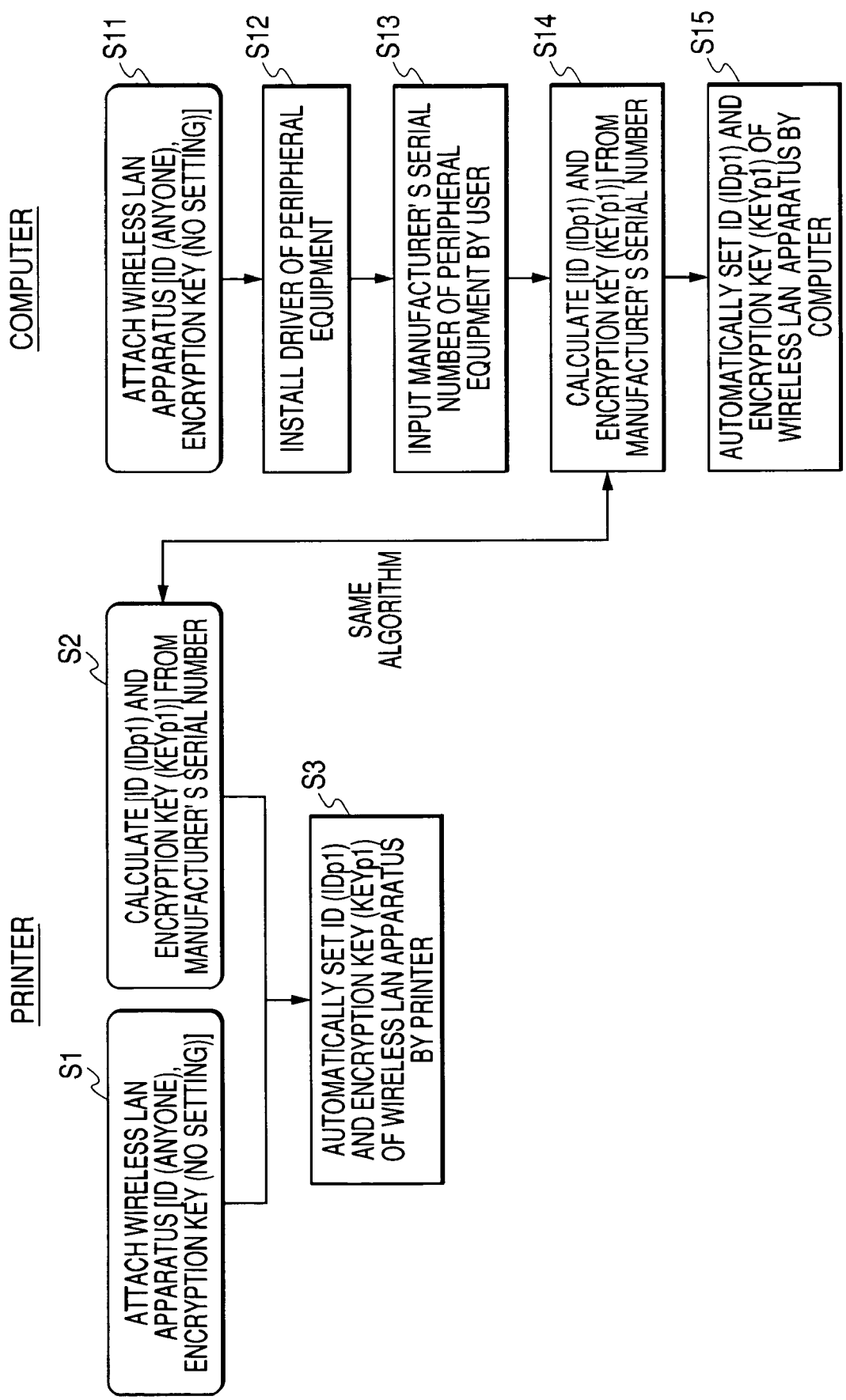

SETTING METHOD FOR WIRELESS COMMUNICATION DEVICE, COMPUTER PERIPHERAL EQUIPMENT, AND INFORMATION PROCESSOR

BACKGROUND OF THE INVENTION

1. Field of the Invention

The present invention relates to a setting method for a wireless communication device, a computer peripheral equipment, and an information processor.

2. Related Background Art

In recent years, the number of wireless LAN apparatuses has increased, and computer peripheral equipment adapted to be wirelessly connected through the wireless LAN apparatus have come onto the market.

The wireless LANs each conforming in system to the IEEE802.11 Standard have come into wide use. In particular, the systems of the wireless LANs conforming to the IEEE802.11b Standard and the IEEE802.11a Standard have become the international standards. The number of personal computer peripheral equipment in each of which the wireless LAN apparatus conforming to the IEEE802.11 Standard is installed and hence which can communicate with personal computers has also increased as the personal computers having the wireless LAN apparatuses conforming to the IEEE802.11b Standard and the IEEE802.11a Standard installed therein have come into wide use.

Here, the most serious problem in the wireless LAN is security. In particular, in a case where the wireless LAN apparatus is used in an ordinary household, in general, an ID such as an Extended Service Set Identifier (ESSID) which has been set upon initialization is continuously used thereafter as it is, and a user is unwilling to set the security using an encryption key or the like.

When a wireless LAN is also used in a neighboring house in a multiple dwelling house such as an apartment or in a heavily residence built-up area of a city, there is a problem in that a computer can be unintentionally connected to the wireless LAN system in the neighboring house and private data can possibly be leaked into the wireless LAN system in the neighboring house.

In the wireless LAN apparatus conforming to the IEEE802.11 Standard, the communication can be carried out in two modes, i.e., a star type connection mode called an infrastructure mode, and a one-to-one correspondence communication mode called an adhoc mode.

In the infrastructure mode described above, a MAC address at an access point which is a center of the star type connection is used as an initial group ID.

On the other hand, in the communication in the adhoc mode, a MAC address of the wireless LAN apparatus is used as an initial value of an ID of the wireless LAN apparatus in many cases. Thus, one ID is used in combination with the other ID.

Here, since "the MAC address" is a number specific to each apparatus, "the MAC address" of one house does not overlap with the ID of a neighboring house, and therefore a personal computer and its peripheral equipment in one house are not wirelessly connected to a personal computer and its peripheral equipment in the neighboring house. In addition, the wireless LAN apparatus conforming to the IEEE802.11 Standard can obtain four channels in Japan as channels having frequency bands not overlapping each other. Hence, normally, a channel which another person uses is not used, and a channel on which a less influence of an interference wave is exerted is used if circumstances allow.

However, an initial ID is a simple initial value such as "Anyone" in some cases, and also no encryption key is set in many cases. Thus, when a user uses an ID which is left as being initialized, a wireless LAN apparatus in the neighboring house which is newly added may be wirelessly connected to a wireless network in the user's own house so that a personal computer in the neighboring house may be wirelessly connected to a printer in the user's own house to print out information. In addition, since the encryption key is not set, data such as file information or contents of a file may be directly viewed through the personal computer in the neighboring house.

SUMMARY OF THE INVENTION

It is an object of the present invention to prevent misconnection to a neighboring network.

It is another object of the present invention to prevent information from leaking to the neighboring network.

It is still another object of the present invention to allow setting of a communication device which an information processor or peripheral equipment uses for communications, to be simply carried out.

Other objects of the present invention will become clear by reading the specification and following description of the preferred embodiments of the present invention.

BRIEF DESCRIPTION OF THE DRAWINGS

FIG. 4 is a flow chart of an operation for setting an ID and an encryption key in a printer and a computer in the embodiments of the present invention.

DESCRIPTION OF THE PREFERRED EMBODIMENTS

Figure 1:
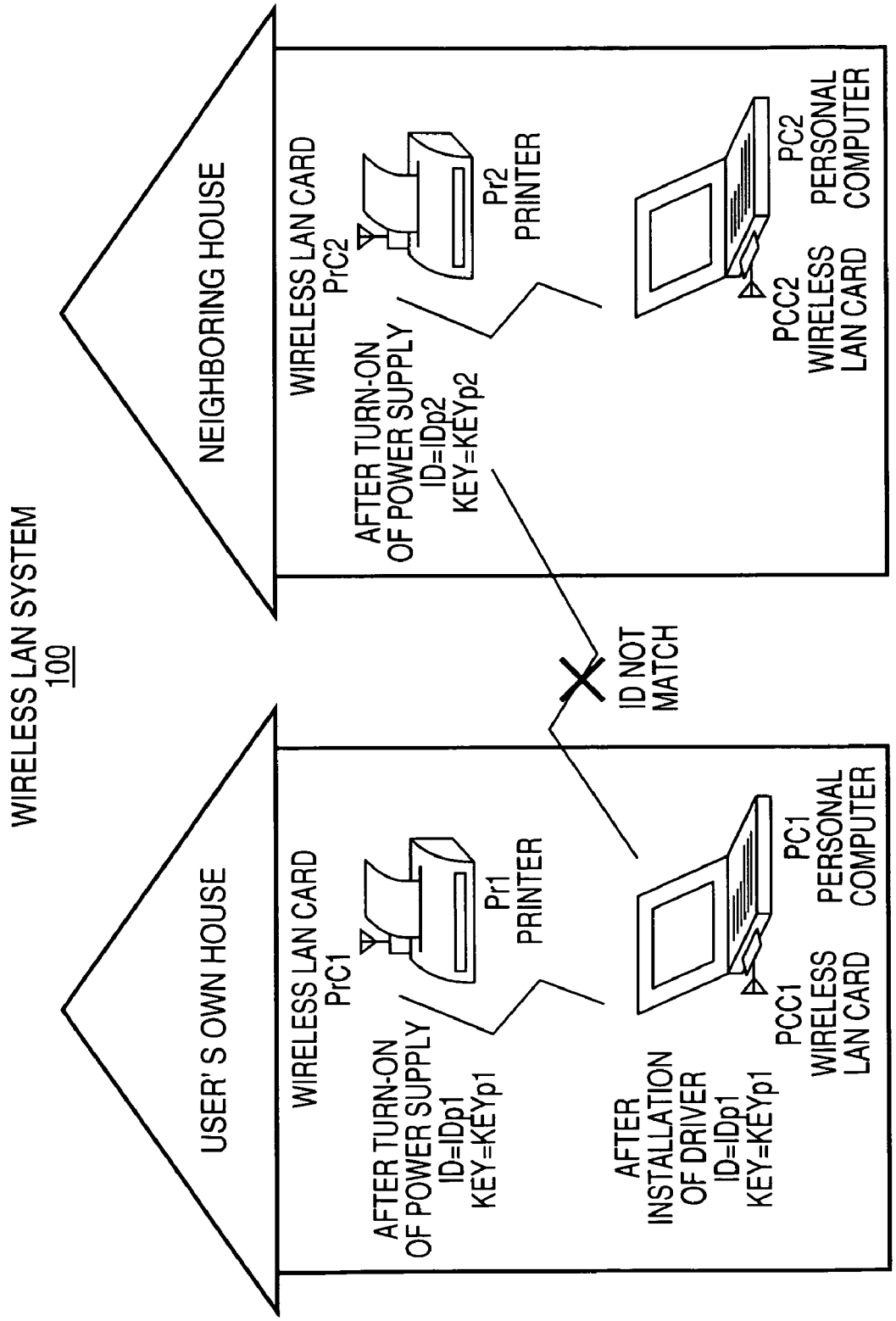
FIG. 1 is a schematic diagram showing a wireless LAN system according to Embodiment 1 of the present invention.

In Embodiments 1 and 2 which will be described later, first of all, when computer peripheral equipment wirelessly connected to a computer through their wireless LAN apparatuses and the wireless LAN apparatus of the computer are initialized, an SSID (hereinafter referred to as "an ID" for short) as a network identifier, and an encryption key which the wireless LAN apparatus of the computer peripheral equipment uses for communications are calculated based on a manufacturer's serial number of the computer peripheral equipment. The resultant ID and encryption key are then stored in the wireless LAN apparatus of the computer peripheral equipment. Then, when driver software of the computer peripheral equipment is installed in the computer wirelessly connected to the computer peripheral equipment, the manufacturer's serial number of the computer peripheral equipment is inputted, and the ID and the encryption key of the wireless LAN apparatus are calculated on the computer using the same algorithm as that in the case of the computer peripheral equipment based on the inputted manufacturer's serial number of the computer peripheral equipment to be stored in the wireless LAN apparatus of the computer.

As a result, the same ID and encryption key as those of the computer peripheral equipment can be set in the computer. In other words, the specific ID and the specific encryption key are set in the computer and the computer peripheral equipment by only installing a driver. Thus, if the adhoc mode for one-to-one correspondence communication is selected, then the computer and the computer peripheral equipment can be readily wirelessly connected to each other, and also are prevented from being wirelessly connected to a network in a neighboring house. As a result, high security can be ensured.

Secondly, when a wireless LAN card is connected to computer peripheral equipment which can carry out communication through the wireless LAN by connecting thereto the wireless LAN card, or when the wireless LAN card is attached to the computer peripheral equipment to first turn ON a power supply, the ID and the encryption key which are calculated based on the manufacturer's serial number of the computer peripheral equipment are set from the computer peripheral equipment to the wireless LAN card.

Heretofore, if the wireless LAN card is attached to the computer peripheral equipment such as a printer, then the ID is determined based on the initialization of the wireless LAN card. Thus, the communication must be carried out after the same setting as that in the wireless LAN card of the computer peripheral equipment such as a printer is made for the wireless LAN equipment of the computer as well. However, in the embodiments which will be described below, if the wireless LAN card is only attached to the computer peripheral equipment such as a printer to turn ON a power supply of the computer peripheral equipment, then the ID and the encryption key which are calculated within the computer peripheral equipment are set in the wireless LAN card attached to the computer peripheral equipment. Thus, if the adhoc mode for the one-to-one correspondence communication is selected, then the computer and the computer peripheral equipment are easily, wirelessly connected to each other without depending on the initialization of the wireless LAN card. Also, high security can be ensured without the wireless connection of the computer and the computer peripheral equipment to the network in the neighboring house.

Thirdly, when the setting is carried out for a plurality of computer peripheral equipment such as a printer and a scanner which are wirelessly connected to the computer through their wireless LAN apparatuses, and the wireless LAN apparatus of the computer, IDs and encryption keys of the wireless LAN apparatuses of a plurality of computer peripheral equipment are calculated based on manufacturer's serial numbers of a plurality of computer peripheral equipment to be stored in the wireless LAN apparatuses of a plurality of computer peripheral equipment. Thus, the wireless LAN apparatus of the computer is wirelessly connected to a plurality of computer peripheral equipment.

Consequently, if the manufacturer's serial numbers of a plurality of computer peripheral equipment are inputted when each of driver software for a plurality of computer peripheral equipment are installed in the computer, the ID and the encryption key of the wireless LAN apparatus are calculated on the computer using the same algorithm as that in the case of the computer peripheral equipment to be stored in the computer. When the computer is wirelessly connected to each of the computer peripheral equipment, the ID and the encryption key which are calculated based on the manufacturer's serial numbers of a plurality of computer peripheral equipment are selected to be set in the wireless LAN apparatus of the computer, whereby it is possible to set the same ID and encryption key as those of each of the computer peripheral equipment in the computer. Consequently, in the case of the adhoc mode, the computer can be easily, wirelessly connected to each of the computer peripheral equipment without being wirelessly connected to the network in the neighboring house while the high security is maintained.

Embodiment 1

Figure 2:
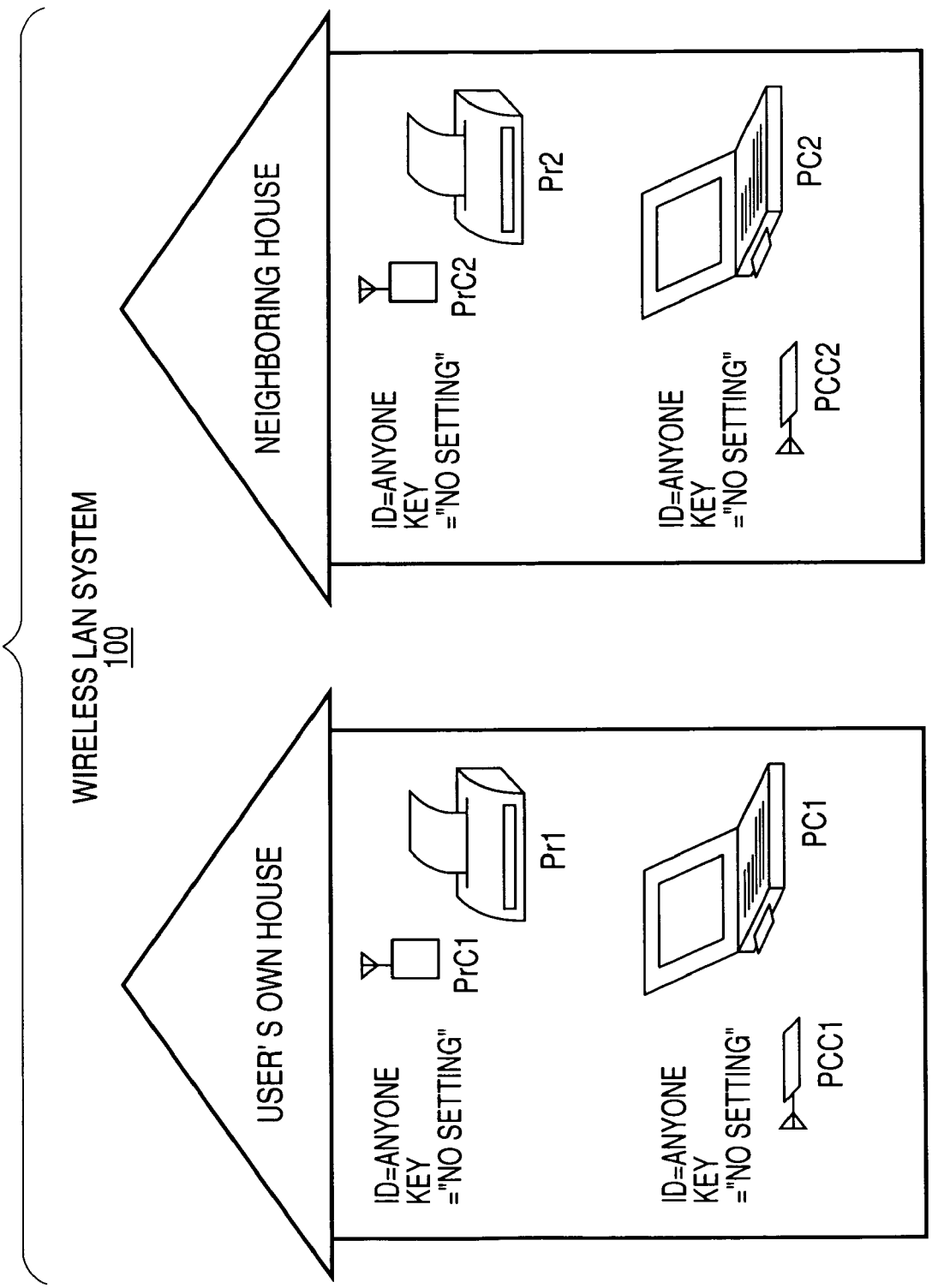
FIG. 2 is a schematic diagram showing the wireless LAN system according to Embodiment 1 of the present invention.

FIGS. 1 and 2 are schematic diagrams each showing a wireless LAN system 100 according to Embodiment 1 of the present invention.

The wireless LAN system 100 includes computers PC1 and PC2, printers Pr1 and Pr2, wireless LAN cards PCC1 and PCC2 for the respective computers PC1 and PC2, and wireless LAN cards PrC1 and PrC2 for the respective printers Pr1 and Pr2.

The computer PC1 is a computer in a user's own house, the computer PC2 is a computer in a neighboring house, the printer Pr1 is a printer in the user's own house, and the printer Pr2 is a printer in the neighboring house.

The computer PC1 has the wireless LAN card PCC1, the computer PC2 has the wireless LAN card PCC2, the printer Pr1 has the wireless LAN card PrC1, and the printer Pr2 has the wireless LAN card PrC2.

FIG. 2 is a schematic diagram showing a state before the wireless LAN cards PCC1 and PCC2, and the wireless LAN cards PrC1 and PrC2 are attached to the computers PC1 and PC2, and the printers Pr1 and Pr2, respectively.

Here, it is supposed that a common initial ID "Anyone" is set as a network identifier (SSID) in the wireless LAN cards PCC1 and PCC2, and the wireless LAN cards PrC1 and PrC2, respectively, and no encryption key is inputted thereto.

When, in the state shown in FIG. 1, the wireless LAN card PrC1 is attached to the printer Pr1 and a power supply of the printer Pr1 is firstly turned ON, the printer Pr1 calculates an ID "IDp1" as a network identifier and an encryption key "KEYp1" based on a manufacturer's serial number of the printer Pr1 to set the ID "IDp1" and the encryption key "KEYp1" thus calculated in the wireless LAN card PrC1.

On the other hand, when a driver of the printer Pr1 is installed in the computer PC1, a user inputs the manufacturer's serial number of the printer Pr1. Then, the printer driver calculates the ID "IDp1" and the encryption key "KEYp1" of the wireless LAN card PCC1 using the same algorithm as that of the printer Pr1 based on the manufacturer's serial number inputted by the user to set the ID "IDp1" and the encryption key "KEYp1" thus calculated in the wireless LAN card PCC1 of the computer PC1.

When the computer PC1 is wirelessly connected to the printer Pr1, the computer PC1 has to obtain one-to-one correspondence communication with the printer Pr1. If the adhoc mode is set in the computer PC1, then the computer PC1 is simply wirelessly connected to the printer Pr1.

In addition, an ID "IDp2" and an encryption key "KEYp2" are also set in the wireless LAN card PCC2 of the computer PC2 and the wireless LAN card PrC2 of the printer Pr2 in the neighboring house, similarly to the setting of the ID "IDp1" and the encryption key "KEYp1" in the computer PC1 and the printer Pr1 in the user's own house.

Since when the wireless LAN is set, the ID specific to the user's own house is automatically set in a manner described above, no communication is made through the initialization of the wireless LAN card. Consequently, even if the wireless LAN is operated in the neighboring house while the wireless LAN card is left as being initialized and thus an electric wave from the wireless LAN apparatus in the neighboring house reaches the wireless LAN apparatus in the user's own house, since the computer PC2 and the printer Pr2 in the neighboring house are not viewed on the network, there is no anxiety about wireless connection of the printer Pr1 to the network in the neighboring house. In addition, since the encryption key is also automatically set, the security against a wiretap or the like can also be readily maintained.

The wireless LAN apparatus of the printer is built in the printer in some cases, and the wireless LAN card is attached to the printer in other cases. When a power supply of the printer is firstly turned ON after the wireless LAN apparatus is wirelessly connected to the printer, the ID and the encryption key are calculated based on the manufacturer's serial number of the printer which is stored in a main body of the printer to be stored in the wireless LAN apparatus. Thus, even when the wireless LAN card is attached to the printer, the specific ID and the specific encryption key can be simply set and also the printer can be safely wirelessly connected to the computer in the user's own house without worrying about the initialization of the wireless LAN card. Thus, there is also no anxiety about the wireless connection of the computer and the printer to the network in the neighboring house.

Moreover, when the printer Pr2 in the neighboring house is identical in maker to but different in model from the printer Pr1 in the user's own house, if the ID and the encryption key are calculated using the same algorithm based on the manufacturer's serial number of the printer Pr1, there is a possibility that the same ID and encryption key as those of the printer Pr1 in the user's own house may be set in the printer Pr2 as well in the neighboring house. In order to prevent such inconvenience, the ID and the encryption key may also be calculated based on a combination of a manufacturer's serial number and model information of the printer. In addition, the IDs and the encryption keys may also be calculated using different algorithm for each model.

Here, with respect to a frequency channel with which the computer and the printer are wirelessly connected to each other, the passive scanning is carried out using the wireless LAN apparatus of the computer, and a user is instructed to set an empty channel in the wireless LAN apparatus on the printer side.

In addition, an initial connection channel may be previously determined, and an empty channel may be automatically set in accordance with a wireless instruction.

Embodiment 2

Figure 3:
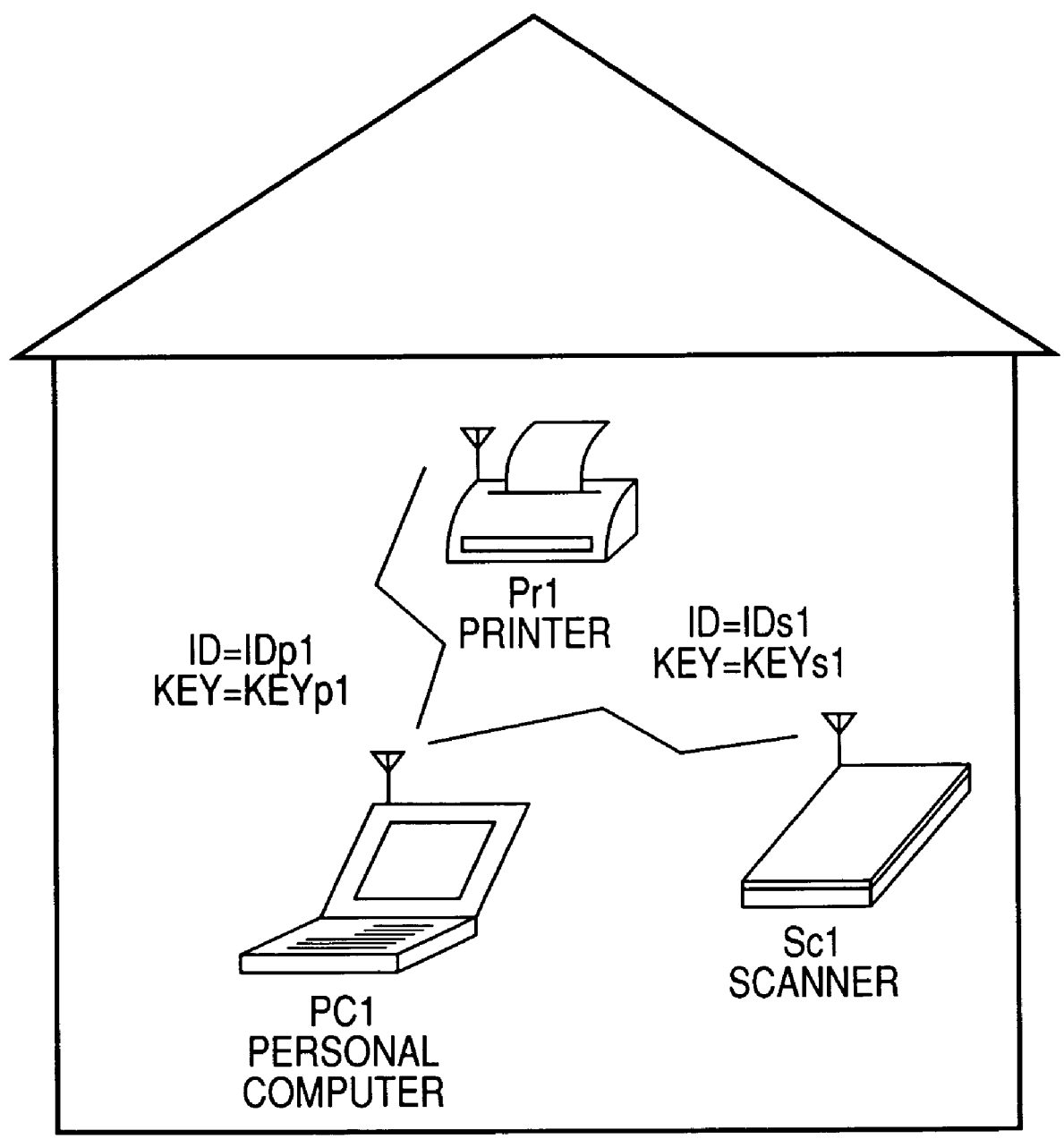
FIG. 3 is a schematic diagram showing a wireless LAN system according to Embodiment 2 of the present invention.

FIG. 3 is a schematic diagram showing a wireless LAN system 200 according to Embodiment 2 of the present invention.

Embodiment 2 shows an example in which in the wireless LAN system 200, one computer is wirelessly connected to a plurality of computer peripheral equipment. In Embodiment 2, the wireless LAN system 200 includes a computer PC1, a printer Pr1, and a scanner Sc1.

In the wireless LAN system 200, the computer PC1, the printer Pr1, and the scanner Sc1 are provided with wireless LAN apparatuses, respectively.

When a power supply is firstly turned ON after the wireless LAN apparatus is attached to the printer Pr1, an ID "IDp1" and an encryption key "KEYp1" which are calculated based on a manufacturer's serial number of the printer Pr1 are set in the wireless LAN apparatus of the printer Pr1. In addition, when a power supply of the scanner Sc1 is firstly turned ON after the wireless LAN apparatus is attached to the scanner Sc1, an ID "IDs1" and an encryption key "KEYs1" which are calculated based on a manufacturer's serial number of the scanner Sc1 are set in the wireless LAN apparatus of the scanner Sc1.

On the other hand, on the computer PC1 side, a manufacturer's serial number of the printer Pr1 is inputted when driver software of the printer Pr1 is installed in the computer PC1, whereby an ID "IDp1" and an encryption key "KEYp1", for the printer Pr1, of the wireless LAN apparatus are calculated on the computer PC1 to be stored in the wireless LAN apparatus of the computer PC1.

In addition, a manufacturer's serial number of the scanner Sc1 is inputted when driver software of the scanner Sc1 is installed in the computer PC1, whereby an ID "IDs1" and an encryption key "KEYs1", for the scanner Sc1, of the wireless LAN apparatus are calculated on the computer PC1 to be stored in the wireless LAN apparatus of the computer PC1.

When the printing is carried out using the printer Pr1 in accordance with an instruction issued from the computer PC1, the printer driver is activated, and an ID "IDp1" and an encryption key "KEYp1" for the printer are calculated based on the manufacturer's serial number of the printer Pr1 to be downloaded into the wireless LAN apparatus of the computer PC1. As a result, the same ID and encryption key as those of the printer Pr1 are set in the wireless LAN apparatus of the computer PC1, and hence the communication becomes possible, thereby allowing the printing to be carried out.

Next, when the computer PC1 takes in information of an image from the scanner Sc1, the driver of the scanner Sc1 is activated, an ID "IDs1" and an encryption key "KEYs1" for the scanner Sc1 are calculated based on the manufacturer's serial number of the scanner Sc1 to be downloaded into the wireless LAN apparatus of the computer PC1. As a result, the same ID and encryption key as those of the scanner Sc1 are set in the wireless LAN apparatus of the computer PC1, and the computer PC1 can communicate with the scanner Pc1, thereby being able to take in the information of an image from the scanner Sc1.

According to Embodiment 2 described above, when the personal computer and a plurality of computer peripheral equipment are wirelessly connected to each other through their wireless LAN apparatuses, the IDs and the encryption keys are calculated based on the manufacturer's serial numbers of the computer peripheral equipment, and the personal computer and a plurality of computer peripheral equipment can be wirelessly connected to each other using the resultant IDs and encryption keys. Hence, if the adhoc mode for the one-to-one correspondence communication is selected, the personal computer and a plurality of computer peripheral equipment can be wirelessly connected to each other with high security without being wirelessly connected to the network in the neighboring house.

Next, an operation of the wireless LAN system according to the embodiments described above will hereinafter be more concretely described.

FIG. 4 is a flow chart of an operation for setting an ID and an encryption key in the printer and the computer in the embodiments described above, respectively.

First of all, a wireless LAN apparatus is attached to the printer (S1). At this time, it is supposed that an ID of the wireless LAN apparatus is "Anyone" and no encryption key is set in the wireless LAN apparatus. Next, the ID "IDp1" and the encryption key "KEYp1" are calculated based on the manufacturer's serial number of the printer (S2). Then, the printer automatically sets the ID "IDp1" and the encryption key "KEYp1" of the wireless LAN apparatus (S3).

On the other hand, on the computer side as well, a wireless LAN apparatus is attached to the computer (S11). In this case, it is supposed that the ID is "Anyone" and no encryption key is set in the wireless LAN apparatus. Then, a driver of the peripheral equipment is installed in the computer (S12), and a user inputs a manufacturer's serial number of the peripheral equipment to the computer (S13).

Next, the ID "IDp1" and the encryption key "KEYp1" are calculated based on the manufacturer's serial number of the attached peripheral equipment (S14). Thereafter, the computer automatically sets the ID "IDp1" and the encryption key "KEYp1" of the wireless LAN apparatus (S15).

According to the above-mentioned method, the communication ID information and the encryption keys of the wireless LAN apparatuses of the peripheral equipment and the computer can be simply set. Moreover, when the wireless LAN system is used in a neighboring house in a multiple dwelling house such as an apartment or a heavily residence built-up area of a city, the computer and the computer peripheral equipment in a user's house are not wirelessly connected to the wireless LAN system in the neighboring house, and thus the private data can be prevented from leaking to the wireless LAN system in the neighboring house.

In addition, even for peripheral equipment which is poor in manipulation property, ID information and an encryption key for its wireless LAN apparatus can be simply set.

Also, when driver software of peripheral equipment is installed, the computer can simply set ID information and an encryption key for a wireless LAN apparatus.

This application claims priority from Japanese Patent Application No. 2003-405228 filed Dec. 3, 2003, which is hereby incorporated by reference herein.

What is claimed is:

1. A method of initializing a wireless communication card attached to a computer peripheral equipment and a wireless communication unit of a computer, comprising:
    a first calculation step of that said computer peripheral equipment calculates identification information and an encryption key to be used for a wireless communication using the wireless communication card attached to the computer peripheral equipment based on identification information of the computer peripheral equipment;
    a first setting step of that said computer peripheral equipment sets the calculated identification information and the encryption key in the wireless communication card attached to the computer peripheral equipment;
    an input step of that a user inputs the identification information of the computer peripheral equipment into said computer at the same time when a driver software of the computer peripheral equipment is installed in the computer;
    a second calculation step of that said computer calculates identification information and an encryption key to be used for wireless communications using the wireless communication unit on the computer based on the inputted identification information of the computer peripheral equipment, when said driver software is installed in the computer;
    a second setting step of that said computer sets the identification information and the encryption key calculated in the second calculation step in the wireless communication unit of the computer; and
    an establishing step of that the wireless communication card attached to the computer peripheral equipment and the wireless communication unit of said computer establish the wireless communication using the identification information and the encryption key which are set in the first and the second setting steps.

2. A method according to claim 1, wherein the calculation of the identification information and the encryption key in the first calculation step is carried out when the wireless communication card is attached to the computer peripheral equipment, or when the wireless communication card is attached to the computer peripheral equipment and a power supply is firstly turned ON.

3. A method according to claim 1, wherein the identification information calculated in the first and second calculation steps is a network identifier.

4. A method according to claim 1, wherein the identification information of the computer peripheral equipment is a manufacturer's serial number of the computer peripheral equipment.

5. A method according to claim 1, wherein the identification information and the encryption key to be used for the wireless communications between the wireless communication card and the wireless communication unit is calculated based on a manufacturer's serial number of the computer peripheral equipment and model information of the computer peripheral equipment in the first and second calculation step.

6. A method according to claim 1, wherein the identification information and the encryption key to be used for wireless communications using the wireless communication unit are calculated for each peripheral equipment in the second calculation step.

* * * * *